United States Patent Office 3,314,932
Patented Apr. 18, 1967

3,314,932
CHROMIUM COMPLEX MIXED AZO DYESTUFFS
Walter Scholl, Cologne-Mulheim, and Gerhard Dittmar, Leverkusen, Germany, assignors to Farbenfabriken Bayer Aktiengesellschaft, Leverkusen, Germany, a corporation of Germany
No Drawing. Filed Jan. 30, 1964, Ser. No. 341,415
Claims priority, application Germany, Feb. 19, 1963, F 39,054
8 Claims. (Cl. 260—145)

The present invention concerns chromium containing azo dyestuffs; more particularly it concerns valuable asymmetrical mixed chromium complex azo dyestuffs of the formula

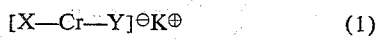

In this formula K stands for a cation, X is the residue of a monoazo dyestuff and Y is the residue of a monoazo dyestuff which is different from X and has the formula

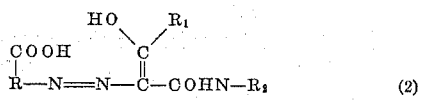

wherein R represents a benzene radical in which the COOH group is in o-position to the azo bridge, $R_1$ represents an alkyl radical and $R_2$ stands for an aromatic carbocyclic radical which contains non-ionic substituents, e.g. lower alkyl and/or chlorine or bromine groups, in the two o-positions relative to the carbon atom carrying the —COHN-group. Dyestuffs of this type are disclosed in copending application Ser. No. 245,382 filed Dec. 18, 1962, now U.S. Patent 3,221,003.

It is an object of the invention to provide novel and valuable asymmetrical chromium complex dyestuffs of the Formula 1. Another object is the provision of wool and silk dyed with the novel dyestuffs of the Formula 1. Still another object is to provide dyestuffs of the Formula 1 which exhibit excellent fastness properties and dyeings on wool and silk which are likewise distinguished by excellent fastness properties.

The novel dyestuffs of the Formula 1 are obtained when the 1:1-chromium complex compound of a monoazo dyestuff X is reacted in approximately equimolar portions with a metal-free monoazo dyestuff of the Formula 2 which is different in structure from the dyestuff X.

The starting dyestuffs of the Formula 2 are obtainable by coupling diazotized anthranilic acid or its nuclear substitution products with those acylacetic acid arylamides which exhibit non-ionic substituents in the two o-positions to the —COHN-group in the aryl nucleus. Suitable acylacetic acid arylamide coupling components are, inter alia, compounds carrying alkyl, alkoxy or halogen substituents in the two positions adjacent to the C atom carrying the —NH-group, such as acetoacetic acid-2',6'-dimethyl anilide, acetoacetic acid-2',6'-dimethyl-3'-sulfamido anilide, acetoacetic acid-2'-chloro-6'-methyl anilide, acetoacetic acid-2'-chloro-6'-methyl-4'-sulphamido anilide etc.

For preparing the monoazo dyestuffs of the Formula 2, there may be used as diazo components, inter alia, besides anthranilic acid itself, the derivatives of anthranilic acid such as 1-amino-2-carboxybenzene-5-sulfonic acid amide, 1-amino-2-carboxybenzene - 4 - sulfonamide, and their derivatives substituted on the amide nitrogen, such as 1-amino-2-carboxybenzene - 5 - sulfonic acid-methylamide, -dimethylamide, -methylhydroxyethylamide, -isopropylamide, -hydroxyethylamide, 1-amino-2-carboxybenzene-5-methyl sulfone, -5-ethyl-sulfone, 1-amino-2-carboxybenzene-4-methyl sulfone, -4-ethyl sulfone, 1-amino 2 - carboxy - 5 - nitrobenzene, 1 - amino - 2-carboxy-4-nitrobenzene, 1 - amino - 2 - carboxy-4- or -5-chloro-benzene, and 1-amino-2-carboxy-3-chlorobenzene.

Metallizable monoazo dyestuff I which must be different from Y, may be any monoazo dyestuff provided it contains metallizable groupings in the o,o'-position to the azo group. Primarily the dyestuffs which may be considered include o,o'-dihydroxy-, o-hydroxy-o'-alkoxy-, o-hydroxy-o'-carboxy- and o-hydroxy-o'-amino-azo dyestuffs. Metallizable monoazo dyestuffs which are especially to be mentioned are obtainable from diazotized o-aminophenols, o-aminophenol ethers or o-aminophenylcarboxylic acids by coupling with hydroxynaphthalenes, 5-pyrozolones, 5-aminopyrazoles, acylacetic acid amides and hydroxybenzenes, whereby the starting components may be further substituted in any desired manner.

Especially interesting and valuable dyestuffs of the green range can be synthesized according to the present process by using as dyestuff X a so-called "blue component." This term comprises those non-metallized monoazo dyestuffs which in the form of their symmetrical 2:1 chromium complexes yield blue, blue-grey and green-blue shades. Numerous dyestuffs of this type are known from the literature; they are synthesized, for example, with the use of the following azo components: 4'-hydroxynaphtho-(2',1'-:4,5) - oxathiol-S-dioxide, 1 - methyl-sulfonylamino-7 - hydroxynaphthalene, 1 - toluene-sulfonylamino - 7 - hydroxynaphthalene, 1 - hydroxy - 5,8 - dichloronaphthalene and 1-hydroxynaphthalene-3,6-disulfonamide. The diazo components to be used are preferably those derived from o-aminophenols, o-aminophenol ethers or o-aminophenyl-carboxylic acids which may be substituted by further non-ionic substituents such as chloro, bromo, lower alkyl, lower alkoxy, sulfonamide, sulfone or nitro groups. The combination of such a blue component X with a yellow component Y yields valuable green mixed chromium complex azo dyestuffs. Suitable blue components X correspond e.g. to the formula

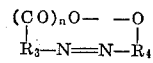

in this formula $R_3$ stands for a residue of the benzene series, $R_4$ stands for a residue of the naphthalene series, $R_3$, carrying the

group in o-position to the azo bridge, n being an integer from 0 to 1 and $R_4$ bearing the —O-group in adjacent position to the azo bridge. Particularly valuable green mixed chromium azo dyestuffs have the formula

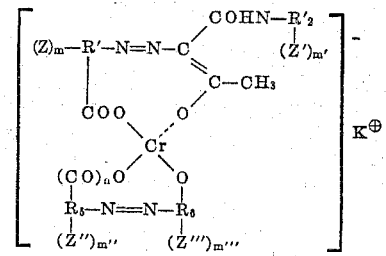

wherein R' stands for a residue of the benzene series carrying the —COO— group in o-position to the azo bridge, Z, Z', Z" and Z'" mean hydrogen, nitro, chloro, bromo, methoxy, sulfonamide and sulfone, m, m', m" and m'" stand for integers ranging from 1 to 2, $R'_2$ stands for a residue of the benzene series, which carries in both o-positions relative the carbon atom carrying the —CONH-group a lower alkyl, chlorine and/or bromine group, $R_5$ stands for a residue of the benzene series wherein the —(CO)$_n$O-group stands in o-position to the azo bridge, and $R_6$ stands for a radical of the naphthalene series carrying the —O— group in o-position to the azo bridge, $n$ is an integer ranging from 0–1, K stands for a cation, the dyestuffs being free of sulfonic acid groups and carboxylic acid groups.

Various processes are known from the literature for the preparation of the 1:1 chromium complex compounds of X. These processes, which are carried out at temperatures of 100 to 150° C., in the open or under pressure, in organic solvents, such as ethylene glycol, with ordinary chromium salts, such as chromic chloride, and in the weakly acidic range (e.g. German patent specification No. 979,373), are particularly favorable.

The reaction of the thus obtainable 1:1 chromium complex compounds with the metal-free monoazo dyestuffs Y is carried out in an aqueous or organic medium which may be weakly acidic, neutral, or weakly alkaline, the last mentioned being preferable, and in the presence of acid-binding agents, such as sodium acetate, sodium carbonate, dilute sodium hydroxide solution, or formamide.

The new asymmetrical mixed chromium complex azo dyestuffs are especially suitable for the dyeing and printing of nitrogen-containing materials, particularly materials of wool, silk, synthetic polyamide and polyurethane fibers. Dyeings of various shades are obtained which have very good fastness properties, especially good fastness to wet processing, to light, to milling, and to ironing. The dyestuffs possess good affinity to the aforesaid materials.

The nature of the cation $K^{\oplus}$ has no influence on the dyeing properties of the novel dyestuffs. The nature of the cation depends principally on the manner of production and, in particular, on the reaction medium from which the dyestuff is precipitated and isolated. For economical reasons the dyestuffs will usually be precipitated by means of inorganic alkali metal salts, such as NaCl, KCl, Na$_2$SO$_4$ and others. The dyestuffs which are formed will then contain the alkali metal cations. Those cations may, however, be replaced by any other cation used in dyestuffs.

The following examples are given for the purpose of illustrating the invention.

*Example 1*

(a) 18.7 parts by weight of 5-chloro-2-amino-1,4-dimethoxybenzene are stirred with 28 parts by volume of hydrochloric acid (d. 1.20) and 50 parts by volume of water. The mixture is cooled with 100 parts by weight of ice and diazotized with a solution of 6.9 parts by weight of sodium nitrite in 25 parts by volume of water.

The diazonium solution thus obtained is run at 0° C. with good stirring into a solution of 23.6 parts by weight of 4′-hydroxynaphtho-(2′,1′:4,5) oxathiol-S-dioxide in 150 parts by volume of water, 14 parts by volume of a sodium hydroxide solution and 150 parts by volume of a 20% by volume sodium carbonate solution. The coupling is completed after a few hours, and the precipitated dyestuff is isolated. The paste is stirred with 500 parts by volume of water and acidified with a small amount of hydrochloric acid. The dyestuff is filtered off with suction and washed several times with water. When dried, the dyestuff is a dark-red powder. It corresponds to the formula

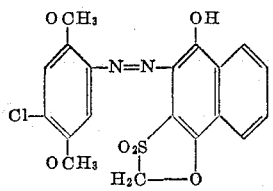

(b) 21.6 parts by weight of 2-aminobenzene-1-carboxylic acid-4-sulfonamide are dissolved in 60 parts by volume of water and 11.5 parts by volume of a 40% by volume sodium hydroxide solution, and mixed with 23 parts by volume of a 30% by volume sodium nitrite solution. This solution is run into a mixture of ice-water and 28 parts by volume of hydrochloric acid (d. 1.20). When the diazotization is completed, the mixture is neutralized by the addition of 6 parts by weight of sodium bicarbonate.

20.5 parts by weight of acetoacetic acid-2′,6′-dimethyl anilide are dissolved in 180 parts by volume of water and 11.5 parts by volume of a 40% by volume sodium hydroxide solution. The mixture is cooled to 0° C. with 115 parts by weight of ice, and 14 parts by volume of glacial acetic acid are added. The diazotization solution is run into the finely dispersed coupling component.

When the coupling is completed, the dyestuff is filtered off with suction and washed several times with water on the suction filter. When dried, it is a slightly yellow powder.

The dyestuff corresponds to the formula

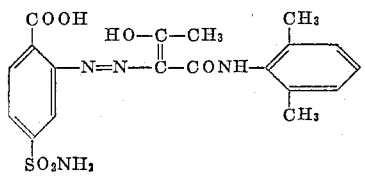

(c) 6.3 parts by weight of the monoazo dyestuff described under section (a) of this example are stirred into 100 parts by volume of ethylene glycol, mixed with 3.85 parts by weight of chromic chloride and heated at 150–155° C. for 6 hours with stirring. The mixture is then cooled to 100° C., and 6.26 parts by weight of the monoazo dyestuff described under section (b) of this example and 25 parts by volume of formamide are added. The mixture is heated at 110–115° C. for 25 minutes, and the solution of the mixed chromium complex is then poured into 700 parts by volume of water. The dyestuff is isolated by adding 20 parts by weight of common salt, and filtered off with suction. The dyestuff paste is again stirred in 700 parts by volume of water at 55° C., dissolved with 1 part by volume of a 40% by volume sodium hydroxide solution and finally isolated by the addition of 33 parts by weight of common salt. The dried dyestuff is a dark green powder which dissolves readily in water with a green color and dyes wool from an organic acid to neutral bath in brilliant, fast green shades.

*Example 2*

(a) 18.7 parts by weight of 5-chloro-2-amino-1,4-dimethoxybenzene are diazotized as described in Example 1(a). The diazo solution is run at 0° C. and with good stirring into a solution of 23.7 parts by weight of 1-methylsulfonyl-amino-7-hydroxynaphthalene in 100 parts by volume of water, 17 parts by volume of a 40% by volume sodium hydroxide solution and 140 parts by volume of a 20% by volume sodium carbonate solution. The coupling is completed after a few hours. The precipitated dyestuff is filtered off with suction, stirred again with 500 parts by volume of water and acidified with a small amount of hydrochloric acid (d. 1.20). It is filtered off with suction and washed several times with water on the suction filter. When dried, the dyestuff is a dark red powder. It corresponds to the formula

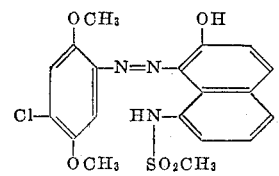

(b) 21.6 parts by weight of 2-aminobenzene-1-carboxylic acid-4-sulfonamide are diazotized as described in Example 1(a). 22.6 parts by weight of acetoacetic acid-2′-methyl-6′-chloroanilide are dissolved in 115 parts by volume of water with 12.5 parts by volume of a 40% by volume sodium hydroxide solution and added dropwise to a solution of 115 parts by volume of water and 13 parts by volume of glacial acetic acid. Coupling is performed by allowing the diazotizing solution to run into the suspension of the coupling component. When the coupling is completed, the mixture is filtered off with suction. The paste is again stirred with 500 parts by volume of water, rendered weakly acid to Congo with a small amount of hydrochloric acid, filtered off with suction and washed several times with water on the suction filter. When dried, the resultant dyestuff is a slightly yellow colored powder. It corresponds to the formula

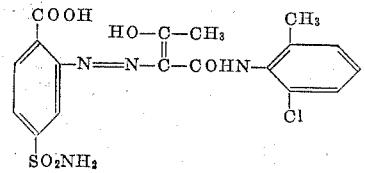

(c) 6.42 parts by weight of the monoazo dyestuff described under section (a) of this example are stirred into 100 parts by volume of ethylene glycol, mixed with 3.85 parts by weight of crystalline chromic chloride and heated at 150–155° C. for 6 hours with stirring. The mixture is then cooled to 100° C., and 6.54 parts by weight of the dyestuff described under section (b) of this example and 25 parts by volume of formamide are introduced. The reaction solution is heated at 110–115° C. for 25 minutes and then poured into 600 parts by volume of water. The mixed chromium complex dyestuff is separated by the addition of 30 parts by weight of rock salt. The dyestuff paste is then stirred in 600 parts by volume of water, dissolved at 50° C. with 1 part by volume of a 40% by volume sodium hydroxide solution and again separated by the addition of 50 parts by weight of rock salt. After filtering off with suction and drying, a dark powder is obtained which dissolves readily in water with a green color and dyes wool in an organic acid to neutral bath in fast green shades.

*Example 3*

(a) 21.6 parts by weight of 2-aminobenzene-1-carboxylic acid-4-sulfamide are diazotized as described in example 1(b). 28.4 parts by weight of acetoacetic acid-2′,6′-dimethyl-3′-sulfamido-anilide are dissolved in 100 parts by volume of water with 19.5 parts by volume of a 40% by volume sodium hydroxide solution and run into a mixture of 100 parts by volume of water and 10 parts by volume of glacial acetic acid. The diazonium salt solution is added to this suspension. When the coupling is completed, the mixture is filtered off with suction, the paste stirred with 500 parts by volume of water and rendered weakly acid to Congo with hydrochloric acid. The dyestuff paste is then filtered off with suction and washed several times with water on the suction filter. A slightly yellow colored powder is obtained after drying. The dyestuff corresponds to the formula

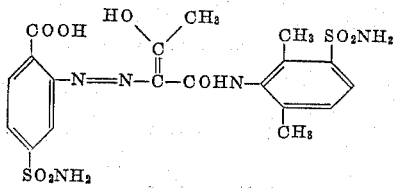

(b) 5.82 parts by weight of the monoazo dyestuff 4-nitro-2-aminophenol→methyl-sulfonylamino-7-hydroxy-naphthalene obtained according to German patent specification No. 951,749, Example 7, are stirred in 100 parts by volume of ethylene glycol, mixed with 3.85 parts by weight of crystalline chromic chloride and heated at 125–130° C. for 5 hours. 7.4 parts by weight of the monoazo dyestuff described under section (a) of this example and 25 parts by volume of formamide are then introduced. The reaction mixture is kept at 110–115° C. for a further 30 minutes, and the solution of the mixed chromium complex dyestuff is then poured into 600 parts by volume of water. The dyestuff is separated by the addition of 60 parts by weight of rock salt. It is filtered off with suction and the paste stirred again in 600 parts by volume of water. The dyestuff is dissolved at 50° C. by the addition of 1 part by volume of a 40% by volume sodium hydroxide solution and salted out by the addition of 60 parts by weight of rock salt. After filtering off with suction and drying, a dark powder is obtained which dissolves in water with a green color and dyes wool from an organic acid to neutral bath in fast green shades.

*Example 4*

According to the methods of production described in the preceding examples, valuable green mixed chromium complex azo dyestuffs can also be synthesized from the dyestuff combinations given in this example and in Examples 5–27, the monoazo dyestuffs stated under section (a) of this example being used in the form of the 1:1 chromium complex and the monoazo dyestuffs stated under section (b) of this example being used in the metal-free form.

(a) 1-amino-2,5-dimethoxy-4-chlorobenzene→4′-hydroxynaphtho-(2′,1′:4.5)-oxathiol-S-dioxide.
(b) 1-amino-2-carboxybenzene-5-sulfonamide→acetoacetic acid-2′-methyl-6′-chloro-anilide.

*Example 5*

(a) 1-amino-2,5-dimethoxy-4-chlorobenzene→4′-hydroxynaphtho-(2′,1′:4,5)-oxathiol-S-dioxide.
(b) 1-amino-2-carboxybenzene-5-sulfonamide→acetoacetic acid-2′,6′-dimethyl-3′-sulfamido-anilide. (Green.)

*Example 6*

(a) 1-amino-2,5-dimethoxy-4-chlorobenzene→4′-hydroxynaphtho-(2′,1′:4,5)-oxathiol-S-dioxide.
(b) 1-amino-2-carboxybenzene→acetoacetic acid-2′,6′-dimethyl-3′-sulfamido-anilide. (Green.)

*Example 7*

(a) 4-chloro-2-amino-1,5-dimethoxy-benzene→4′-hydroxynaphtho-(2′,1′:4,5)-oxathiol-S-dioxide.
(b) 1-amino-2-carboxybenzene-5-sulfonamide→acetoacetic acid-2′,6′-dimethyl anilide. (Green.)

*Example 8*

(a) 1-amino-2-hydroxy-5-chlorobenzene-4-sulfonamide→4′-hydroxynaphtho-(2′,1′:4,5)-oxathiol-S-dioxide.
(b) 1-amino-2-carboxybenzene-5-sulfonamide→acetoacetic acid-2′,6′-dimethyl anilide. (Green.)

*Example 9*

(a) 1-amino-2,5-dimethoxy-benzene-4-sulfonamide→4′-hydroxynaphtho-(2′,1′:4,5)-oxathiol-S-dioxide.
(b) 1-amino-2-carboxybenzene-5-sulfonamide→acetoacetic acid-2′,6′-dimethyl anilide. (Green.)

*Example 10*

(a) 1-amino-2-methoxy-4,5-dichlorobenzene→4′-hydroxynaphtho-(2′,1′:4,5)-oxathiol-S-dioxide.
(b) 1-amino-2-carboxybenzene-5-sulfonamide→acetoacetic acid-2′,6′-dimethyl anilide. (Green.)

*Example 11*

(a) 1-amino-2,4-dimethoxy-benzene→4′-hydroxynaphtho-(2′,1′:4,5)-oxathiol-S-dioxide.
(b) 1-amino-2-carboxybenzene-5-sulfonamide→acetoacetic acid-2′,6′-dimethyl anilide. (Green.)

*Example 12*

(a) 1-amino-2-hydroxybenzene-5-sulfodimethylamide→4′-hydroxynaphtho-(2′,1′:4,5)-oxathiol-S-dioxide.

b) 1-amino-2-carboxybenzene-5-sulfonamide→acetoacetic acid-2',6'-dimethyl analide. (Green.)

*Example 13* a) 1-amino-2,5-dimethoxybenzene-4-sulfonamide→4'-hydroxynaphtho-(2',1'-4:5)-oxathiol-S-dioxide.
b) 1-amino-2-carboxybenzene-5-sulfonamide→acetoacetic acid-2',6'-dimethyl anilide. (Green.)

*Example 14* a) 1-amino-2-hydroxy-5-chlorobenzene→4'-hydroxynaphtho-(2',1'-4:5)-oxathio-S-dioxide.
b) 1-amino-2-carboxy-benzene-5-sulfonamide→acetoacetic acid-2',6'-dimethyl-3'-sulfamido anilide. (Green.)

*Example 15* a) 1-amino-2,5-dimethoxy-4-chlorobenzene→methylsulfonylamido-7-hydroxynaphthalene.
b) 1-amino-2-carboxybenzene-5-sulfonamide→acetoacetic acid-2',6'-dimethyl-3'-sulfamido-analide. (Green.)

*Example 16* a) 1-amino-2,5-dimethoxy-4-chlorobenzene→1-methyl-sulfonylamido-7-hydroxynaphthalene.
b) 1-amino-2-carboxybenzene→acetoacetic acid-2',6'-dimethyl-3'-sulfamido-anilide. (Green.)

*Example 17* a) 1-amino-2,5-dimethoxy-benzene-4-sulfonamide→1-methyl-sulfonylamido-7-hydroxynaphthalene.
b) 1-amino-2-carboxybenzene-5-sulfonamide→acetoacetic acid-2',6'-dimethyl anilide. (Green.)

*Example 18* a) 1-amino-2,5-dimethoxy-4-chlorobenzene→1-methyl-sulfonylamino-7-hydroxynaphthalene.
b) 1-amido-2-carboxybenzene-5-sulfonamide→acetoacetic acid-2',6'-dimethyl anilide. (Green).

*Example 19*

(a) 1-amino-2-hydroxybenzene-5-ethyl sulfone→1-methyl-sulfonyl-amino-7-hydroxynaphthalene.
(b) 1-amino-2-carboxybenzene→acetoacetic acid-2',6'-dimethyl-3'-sulfamido anilide. (Green.)

*Example 20*

(a) 1-amino-2-hydroxy-5-nitrobenzene→1-methyl-sulfonyl-amino-7-hydroxynaphthalene.
(b) 1-amino-2-carboxybenzene→acetoacetic acid-2',6'-dimethyl-3'-sulfamido-anilide. (Green.)

*Example 21*

(a) 1-amino-2-methoxy-4,5-dichlorobenzene→1-methyl-sulfonyl-amino-7-hydroxynaphthalene.
(b) 1-amino-2-carboxybenzene-4-sulfonamide→acetoacetic acid-2',6'-dimethyl anilide. (Green.)

*Example 22*

(a) 1-amino-2-methoxy-4-nitrobenzene→1-methyl-sulfonyl-amino-7-hydroxynaphthalene.
(b) 1-amino-2-carboxybenzene-4-sulfonamide→acetoacetic acid-2',6'-dimethyl analide. (Green.)

*Example 23*

(a) 1-amino-2-hydroxy-5-chlorobenzene-4-sulfonamide→1-methyl-sulfonyl-amino-7-hydroxynaphthalene.
(b) 1-amino-2-carboxybenzene-4-sulfo-methyl-amide→acetoacetic acid-2',6'-dimethyl anilide. (Green.)

*Example 24*

(a) 1-amino-2,5-dimethoxy-4-nitrobenzene→1-methyl-sulfonyl-amino-7-hydroxynaphthalene.
(b) 1-amino-2-carboxybenzene-5-sulfo-methyl-amide→acetoacetic acid-2',6'-dimethyl anilide. (Green.)

*Example 25*

(a) 1-amino-2,4-dimethoxy-5-chlorobenzene→1-methyl-sulfonyl-amino-7-hydropynaphthalene.
(b) 1-amino-2-carboxybenzene-5-sulfo-methlamide→acetoacetic acid-2',6'-dimethyl anilide. (Green.)

*Example 26*

(a) 1-amino-2-hydroxybenzene-4-sulfonamide→1-hydroxy-5,8-dichloronaphthalene.
(b) 1-amino-2-carboxybenzene-5-sulfonamide→acetoacetic acid-2',6'-dimethyl anilide. (Green.)

*Example 27*

(a) 1-amino-2-methoxy-4-nitro-5-chlorobenzene→1-hydroxy-naphthalene-3,6-disulfonamide.
(b) 1-amino-2-carboxybenzene→acetoacetic acid-2',6'-dimethyl anilide. (Green.)

*Example 28*

1 part by weight of the mixed chromium complex dyestuff obtained according to Example 1 is dissolved in 4000 parts by volume of water and mixed with 5 parts by weight of ammonium acetate. 100 parts by weight of wool yarn are introduced into the dyebath at 50° C. and the bath is heated to boiling temperature within 20 minutes. Boiling is then carried out for one hour. The wool yarn is then rinsed and dried; a clear yellow dyeing with good fastness properties is obtained.

*Example 29*

(a) 5-chloro-2-amino-1,4-dimethoxy-benzene→4'-hydroxy-naphtho(2',1':4,5)-oxathiol-S-dioxide
(b) 2-aminobenzene-1-carboxylic acid-4-sulfomethylamide→acetoacetic acid-2',6'-dimethyl-3'-dimethylsulfamido-anilide

*Example 30*

(a) 5-chloro-2-amino-1,4-dimethoxy-benzene→4'-hydroxy-naphtho(2',1':4,5)-oxathiol-S-dioxide
(b) 2-aminobenzene-1-carboxylic acid-4-sulfonamide→acetoacetic acid-2',6'-dimethyl-3'-dimethylsulfamido-anilide

*Example 31*

(a) 5-chloro-2-amino-1,4-dimethoxy-benzene→4'-hydroxy-naphtho(2',1':4,5)-oxathiol-S-dioxide
(b) 2-aminobenzene-1-carboxylic acid-4-sulfonamide→acetoacetic acid-2',6'-dimethyl-3'-methylsulfamido-anilide

*Example 32*

(a) 5-chloro-2-amino-1,4-dimethoxy-benzene→4'-hydroxy-naphtho(2',1':4,5)-oxathiol-S-dioxide
(b) 2-aminobenzene-1-carboxylic acid-4-sulfomethylamide→acetoacetic acid-2',6'-dimethyl-3'-methylsulfamido-anilide

*Example 33*

(a) 1-amino-2-methoxy-4-nitrobenzene→1-methylsulfonylamino-7-hydroxynaphthalene
(b) 2-aminobenzene-1-carboxylic acid-4-sulfonamide→acetoacetic acid-2',6'-dimethyl-anilide

*Example 34*

(a) 1-amino-2-methoxy-4-nitrobenzene→4'-hydroxy-naphtho-(2',1':4,5)-oxathiol-S-dioxide
(b) 2-amino-benzene-1-carboxylic acid-4-sulfonamide→acetoacetic acid-2',6'-dimethyl-anilide

*Example 35*

(a) 1-amino-2-hydroxy-4-acetylaminobenzene→4'-hydroxy-naphtho-(2',1':4,5)-oxathiol-S-dioxide
(b) 2-amino-benzene-1-carboxylic acid-4-sulfonamide→acetoacetic acid-2',6'-dimethylanilide

Example 36

(a) 1-amino-2-hydroxy-5-acetylamino-benzene→4'-hydroxy-naphtho-(2',1':4,5)-oxathiol-S-dioxide
(b) 2-amino-benzene-1-carboxylic acid-4-sulfonamide→acetoacetic acid-2',6'-dimethyl-anilide

Example 37

(a) 1-amino-2-hydroxy-4-acetylamino-benzene→1-methyl-sulfonylamino-7-hydroxy-naphthalene
(b) 2-amino-benzene-1-carboxylic acid-4-sulfonamide→acetoacetic acid-2',6'-dimethylanilide

Example 38

(a) 1-amino-2-hydroxy-5-acetylaminobenzene→1-methyl-sulfonylamino-7-hydroxynaphthalene
(b) 2-amino-benzene-1-carboxylic acid-4-sulfonamide→acetoacetic acid-2',6'-dimethylanilide

Example 39

(a) 1-amino-2,5-dimethoxy-4-chlorobenzene→4'-hydroxy-naphtho-(2',1':4,5)-oxathiol-S-dioxide
(b) 2-amino-1-carboxylic acid benzene→acetoacetic acid-2',6'-dimethyl-anilide

Example 40

(a) 1-amino-2,5-dimethoxy-4-chlorobenzene→1-methyl-sulfonylamino-7-hydroxy-naphthalene
(b) 2-amino-1-carboxylic acid-benzene→acetoacetic acid-2',6'-dimethylanilide

Example 41

(a) 1-amino-2-methoxy-4-nitro-benzene→4'-hydroxy-naphtho-(2',1':4,5)-oxathiol-S-dioxide
(b) 2-amino-1-carboxylic acid-benzene→acetoacetic acid-2',6'-dimethyl-anilide

Example 42

(a) 1-amino-2-methoxy-4-nitro-benzene→1-methyl-sulfonylamino-7-hydroxy-naphthalene
(b) 2-amino-1-carboxylic acid-benzene→acetoacetic acid-2',6'-dimethylanilide

We claim:

1. An asymmetrical chromium mixed complex azo dyestuff of the formula $$[X\text{---}Cr\text{---}Y]^{\ominus} K^{\oplus}$$

wherein K denotes a cation, X is the radical of a monoazo dyestuff, and Y is the radical of a monoazo dyestuff differing from X and being of the formula:

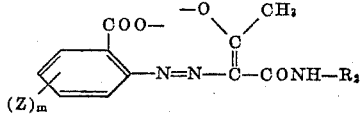

wherein Z stands for —SO$_2$NH$_2$, —SO$_2$NHCH$_3$, —SO$_2$N(CH$_3$)$_2$, —SO$_2$NHC$_2$H$_4$OH $$-SO_2N\diagup^{CH_3}_{C_2H_4OH}$$

—SO$_2$NH-isopropyl, —SO$_2$CH$_3$, —SO$_2$C$_2$H$_5$, —NO$_2$, Cl, or hydrogen, m stands for an integer ranging from 1 to 2, and R$_2$ represents a monocyclic six-membered aryl radical having a lower alkyl group as a substituent in each o-position relative to the carbon atom attached to the —CONH— group.

2. A dyestuff of claim 1 wherein the dyestuff X corresponds to the formula:

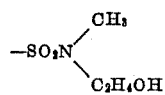

wherein R$_4$ stands for a residue of the naphthalene series with the —O— group being attached to R$_4$ in a position ortho to the azo bridge; Z'' stands for hydrogen, methoxy, nitro, —Cl, —SO$_2$NH$_2$, —SO$_2$N(CH$_3$)$_2$, CH$_3$CONH—, or C$_2$H$_5$SO$_2$—; Z''' stands for hydrogen, —Cl, CH$_3$SO$_2$NH—, p-toluolsulfonylamino, or, when R$_4$ is a naphthalene ring having the —O— radical as a substituent in the 1-position and an azo bridge attached to the 2-position, —OCH$_2$SO$_2$— linked via the —SO$_2$ group to the 3-position and via the —O— radical to the 4-position; m is an integer of 1–2; and n is an integer of 0–1.

3. A chromium complex azo dyestuff of the formula:

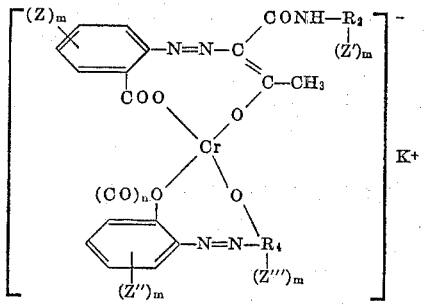

wherein R$_2$ stands for a residue of the benzene series having a lower alkyl substituent in each of the two o-positions relative to the carbon atom attached to the —CONH— group; R$_4$ stands for a radical of the naphthalene series carrying the —O— group in the o-position to the azo bridge; n stands for an integer ranging from 0–1; Z stands for —SO$_2$NH$_2$, —SO$_2$NHCH$_3$, —SO$_2$N(CH$_3$)$_2$, —SO$_2$NHC$_2$H$_4$OH

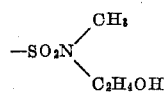

—SO$_2$NH-isopropyl, —SO$_2$CH$_3$, —SO$_2$C$_2$H$_5$, —NO$_2$, —Cl and hydrogen; Z' stands for hydrogen, —Cl, —SO$_2$NH$_2$, —SO$_2$NHCH$_3$, and —SO$_2$N(CH$_3$)$_2$; Z'' stands for hydrogen, methoxy, nitro, —Cl, —SO$_2$NH$_2$, —SO$_2$N(CH$_3$)$_2$, CH$_3$CONH—, and C$_2$H$_5$SO$_2$—; Z''' stands for hydrogen, —Cl, CH$_3$SO$_2$NH—, p-toluol-sulfonylamino, and, when R$_4$ is a naphthalene ring having the —O— radical as a substituent in the 1-position and an azo bridge attached to the 2-position, —OCH$_2$SO$_2$— linked via the —SO$_2$ group to the 3-position and via the —O— radical to the 4-position; m is an integer from 1–2; and K stands for a cation; the dyestuff being free of sulfonic acid groups and carboxylic acid groups.

4. The 2:1 mixed chromium complex dyestuff of the formula

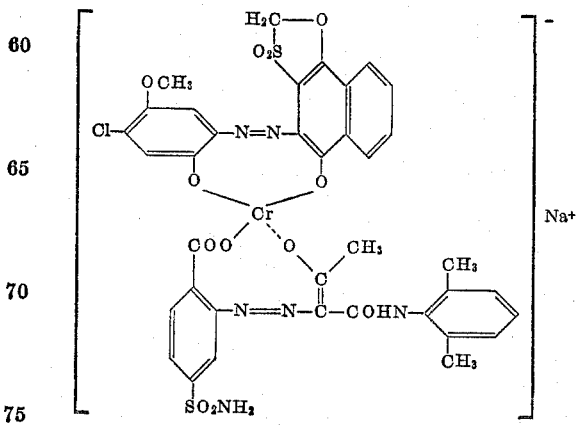

5. The 2:1 mixed chromium complex dyestuff of the formula

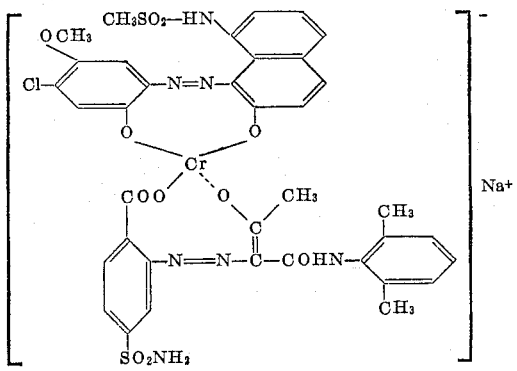

6. The 2:1 mixed chromium complex dyestuff of the formula

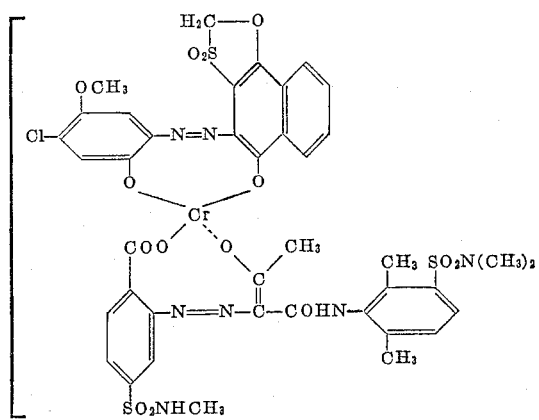

7. The 2:1 mixed chromium complex dyestuff of the formula

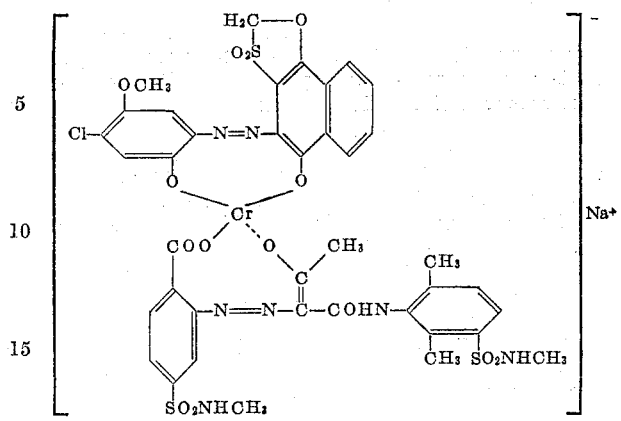

8. The 2:1 mixed chromium complex dyestuff of the formula

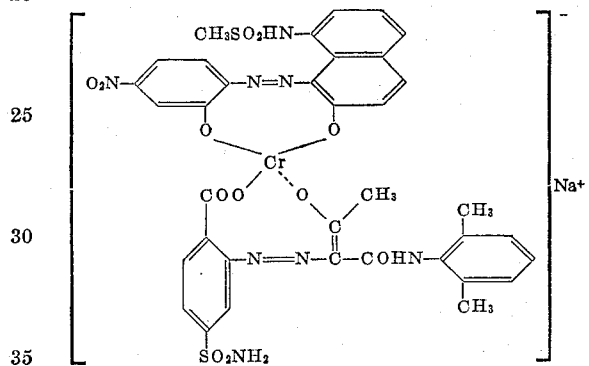

References Cited by the Examiner

UNITED STATES PATENTS

| | | | |
|---|---|---|---|
| 3,005,813 | 10/1961 | Brassel et al. | 260—145 |
| 3,067,191 | 12/1962 | North et al. | 260—145 |
| 3,221,003 | 11/1965 | Scholl et al. | 260—145 |

CHARLES B. PARKER, *Primary Examiner.*
DONALD M. PAPUGA, *Assistant Examiner.*